United States Patent
Huang et al.

(10) Patent No.: US 9,202,053 B1
(45) Date of Patent: Dec. 1, 2015

(54) MBR INFECTION DETECTION USING EMULATION

(71) Applicants: Yong Huang, Nanjing (CN); Hua Ye, Nanjing (CN); Hong Bo Gan, Nanjing (CN); Yue Feng Li, Nanjing (CN)

(72) Inventors: Yong Huang, Nanjing (CN); Hua Ye, Nanjing (CN); Hong Bo Gan, Nanjing (CN); Yue Feng Li, Nanjing (CN)

(73) Assignee: Trend Micro Inc., Tokyo (JP)

( * ) Notice: Subject to any disclaimer, the term of this patent is extended or adjusted under 35 U.S.C. 154(b) by 330 days.

(21) Appl. No.: 13/779,422

(22) Filed: Feb. 27, 2013

(51) Int. Cl.
*G06F 11/00* (2006.01)
*G06F 21/56* (2013.01)

(52) U.S. Cl.
CPC ............ *G06F 21/566* (2013.01); *G06F 21/561* (2013.01)

(58) Field of Classification Search
CPC ............................. H04L 63/145; G06F 21/56
USPC ....................................................... 726/22–25
See application file for complete search history.

(56) References Cited

U.S. PATENT DOCUMENTS

| | | | |
|---|---|---|---|
| 7,941,641 B1* | 5/2011 | Jung .............................. | 712/209 |
| 2002/0166059 A1* | 11/2002 | Rickey et al. .................. | 713/200 |
| 2004/0006689 A1* | 1/2004 | Miller et al. ....................... | 713/1 |
| 2008/0092216 A1* | 4/2008 | Kawano et al. ................... | 726/5 |

* cited by examiner

*Primary Examiner* — Anthony Brown
(74) *Attorney, Agent, or Firm* — Beyer Law Group LLP

(57) ABSTRACT

Emulation software executes upon an operating system of a computer and creates an emulated computer. Bootstrapping code is read into this emulated computer from a sector (such as a master boot record) of a mass storage device. Instructions in the bootstrapping code are executed by an instruction emulator (also using an emulated CPU, emulated memory and an emulated hard disk) and these instructions and behavior are collected as each instruction executes. Access to the actual hard disk may be allowed. The collected information is then compared to a virus signature or behavior rules indicating malware and a conclusion is drawn as to whether the bootstrapping code includes malicious software.

20 Claims, 4 Drawing Sheets

MBR Emulation System

MBR Emulation System

MBR INFECTION DETECTION USING EMULATION

FIELD OF THE INVENTION

The present invention relates generally to detection of malicious software on a computer. More specifically, the present invention relates to detection of an infected master boot record.

BACKGROUND OF THE INVENTION

Malicious software that targets computer systems continues to evolve and attack computers in different ways. One relatively recent development is the use of malicious software to target the master boot record (MBR) of a computer.

As known in the art, the master boot record is a special type of sector of a hard disk (removable or fixed) or other mass storage device that is typically located at the very beginning of a hard disk (often in the first sector). The master boot record includes the bootstrapping code and a partition table, as well as other information. Often, the actual bootstrapping code is different from disk to disk, based on different operating systems.

One type of malicious software (or malware) that infects the master boot record and is especially advanced and problematic is an MBR rootkit. An MBR rootkit (such as the malware "Popureb") buries itself (and hides) in the master boot record and can be difficult to detect and remove. Because it hides within the master boot record, such a rootkit can make itself, and any follow-on malware installed by the rootkit, invisible to both the operating system and to any antivirus security software. Traditional techniques have relied upon malware signatures in order to detect such malware within the master boot record.

Unfortunately, just as other malware writers may use packer software (e.g., UPX, ASProtect) to compress and hide the true nature of their malicious software, more and more rootkits are now encrypting an infected master boot record in order to evade detection from antivirus software. For example, a variant of the TDSS family of malware is known to infect a clean master boot record and then encrypt the resulting infected master boot record with a private cryptographic key (which has been generated according to a specific characteristic of the machine). Because each encryption scheme on each machine will be different, each infected master boot record will be different from that of any other machine and thus more difficult to detect.

Furthermore, because of the encryption, traditional static binary signature-based detection methods are not effective in detecting an infected master boot record that has been encrypted. In addition, using a whitelist to identify an infected master boot record (e.g., by creating a hash of the bootstrapping code) is not entirely effective because of the false positives that have low confidence. Whitelist detection is unable to identify which type of malware has infected the computer, meaning that a security software product would not know how to clean the computer. Moreover, cleaning the computer with the wrong product (or when not necessary) may be disastrous. Finally, the technique of reinstalling the operating system (recommended by some operating system developers) is extremely time consuming and may result in loss of data.

Therefore, in consideration of the above problems with prior art approaches, a new technique is desired to detect infected master boot records, especially those that have been encrypted by malicious software.

SUMMARY OF THE INVENTION

To achieve the foregoing, and in accordance with the purpose of the present invention, a technique is disclosed that detects infection of a sector of a mass storage device in a computer by allowing bootstrapping code to execute within an emulated computer.

In particular, the present invention presents a technique to detect infection of a master boot record based upon instruction emulation. In addition to instruction emulation, CPU and memory emulation is used, as well as hard disk emulation (which also supports real disk accessing).

In one embodiment, emulation software executes upon an operating system of a computer and creates an emulation environment in which a computer is emulated. Bootstrapping code is read into this emulation environment from a sector of a mass storage device, which is typically a master boot record of a hard disk. Instructions in the bootstrapping code are executed by an instruction emulator and information is collected as each instruction executes. The collected information is then compared either to a virus signature or rules indicating malware and a conclusion may be drawn as to whether the bootstrapping code includes malicious software.

In a second embodiment, emulation software executes upon an operating system of a computer and creates an emulation environment in which a computer is emulated. Bootstrapping code is read into this emulation environment from a sector of a mass storage device, which is typically a master boot record of a hard disk. Instructions in the bootstrapping code are handled by an instruction emulator and these executable instructions are collected and stored for later analysis. These stored instructions are then compared to a virus signature and a conclusion may be drawn as to whether the bootstrapping code includes malicious software.

In a third embodiment, emulation software executes upon an operating system of a computer and creates an emulation environment in which a computer is emulated. Bootstrapping code is read into this emulation environment from a sector of a mass storage device, which is typically a master boot record of a hard disk. Instructions in the bootstrapping code are handled by an instruction emulator and these executing instructions exhibit certain behavior such as interrupt calls, disk access requests, memory changes, etc. This behavior is stored and then compared to behavior rules indicating malware and a conclusion may be drawn as to whether the bootstrapping code includes malicious software.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
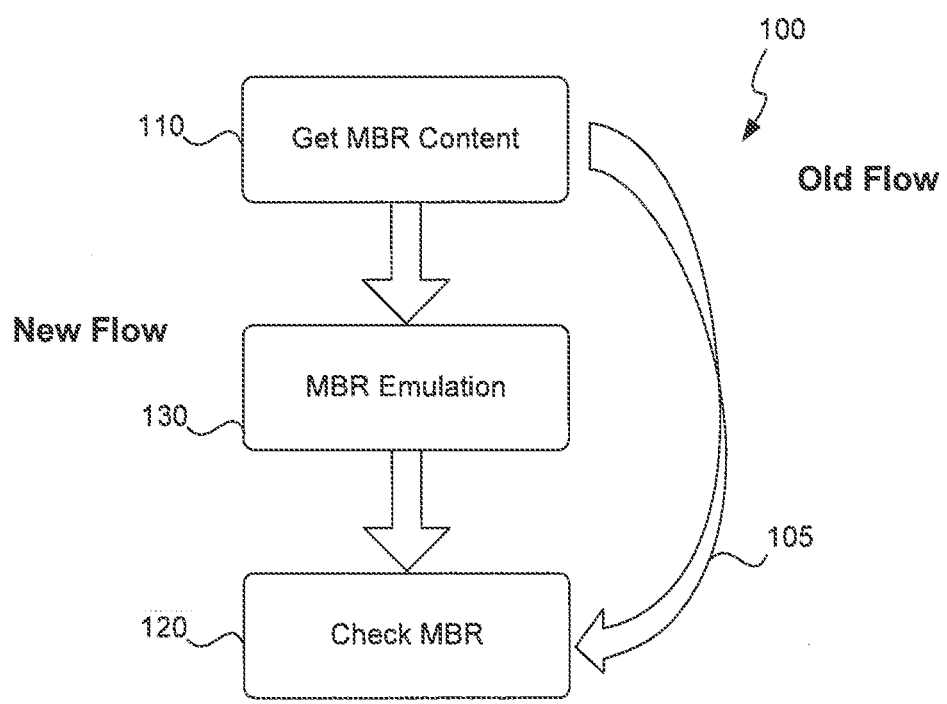
FIG. 1 shows both a prior art approach and an embodiment of the present invention.

FIG. 1 at 100 shows both a prior art approach and an embodiment of the present invention. A prior art approach 105 begins with obtaining the contents of the master boot record in a step 110 and then checking the master boot record in step 120. This checking may involve comparing the binary contents of the master boot record with a virus signature or observing the behavior of execution of the master boot record in an actual computer. As explained above, comparing the contents of the master boot record with a virus signature may be ineffective because the master boot record may be partially encrypted by malicious software. Also, monitoring the behavior of the master boot record as its instructions are executed may result in actual harm to the computer system.

A new flow uses emulation of the master boot record in step 130 after its contents have been obtained. Emulation not only allows the plain instructions of the master boot record to be obtained, but also allows the behavior of the master boot record to be analyzed without the risk of harm to the computer system. Once emulation of the master boot record has been performed, the master boot record instructions may be compared to a virus signature or its behavior during execution may be compared to malware detection rules.

Block Diagram

Figure 2:
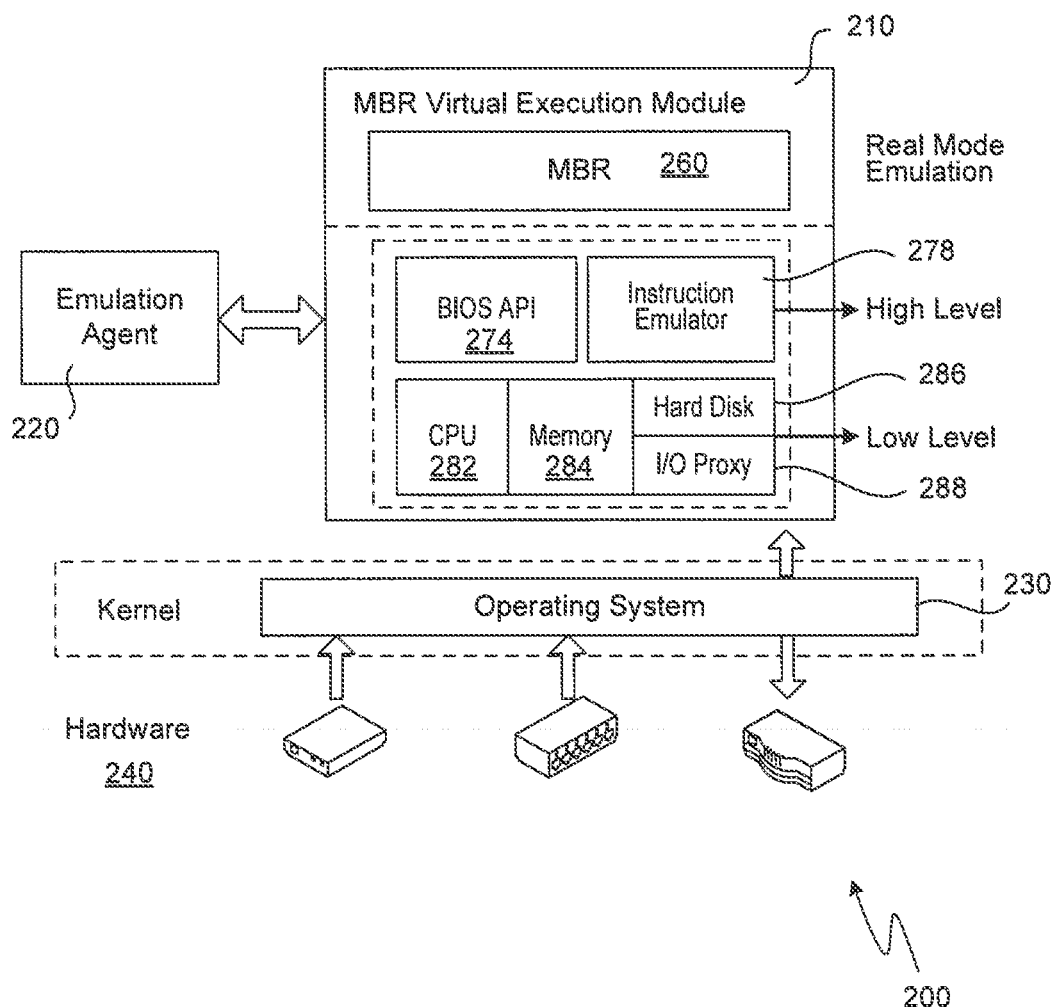
FIG. 2 is a block diagram of an MBR emulation system.

FIG. 2 is a block diagram of an MBR emulation system 200. Shown is a single computer system having hardware 240 and an operating system 230. The hardware and operating system may be any familiar to those of skill in the art. Included within the hardware are a CPU, memory chips or boards, a network card, a mass storage device such as a hard disk or solid-state disk, etc. Executing within the operating system is an MBR virtual execution module 210 which emulates a computer. Thus, execution of the MBR within this execution module insulates the executed instructions from the host computer 240 and prevents harm to the hardware or operating system 230 if malware is present within the master boot record.

The execution module 210 provides an emulated environment in which the bootstrapping code from the master boot record may execute and may be a normal user mode application. Module 210 may be custom code, may be based upon a commercial software emulator (such as those available from VMware, Connectix, VirtualBox, etc.), or may be implemented using an open source software emulator such as Bochs. The emulation provided by execution module 210 emulates an actual hardware computer including its CPU, I/O devices, BIOS, etc. Through this emulation, the bootstrapping code from the master boot record will "think" that it is executing on a real machine, any encrypted malware will decrypt itself, the bootstrapping code will execute, and any of a variety of function calls, API calls etc. will be made not only by legitimate code but also by any malicious code present.

The execution module 210 includes a number of submodules and data present within its executing environment. MBR code 260 refers to the bootstrapping code retrieved from the master boot record on disk. High-level emulation is provided by BIOS API 274 and instruction emulator 278 which provide support for the executing bootstrapping code from the master boot record. API 274 emulates an actual BIOS by allowing an emulated instruction to call a particular function, and can respond by providing information that an emulated instruction would expect. API 274 preferably does not actually interact with the real BIOS of the hardware 240 and operating system 230. Preferably any calls to the BIOS API 274 are handled by emulation and are not passed to the actual BIOS. Instruction emulator 278 is software that emulates the execution of the bootstrapping code 260 one instruction at a time, it supports the complete instruction set that may be found within the master boot record bootstrapping code. By emulating these instructions, any malware found within the MBR would not realize that it is not actually executing upon real computer hardware.

Low-level emulation includes emulation of hardware such as a CPU 282, memory 284, a hard disk 286 and an I/O proxy 288. Emulation of a CPU 282 includes the registers and other essential parts of a CPU that are needed to support execution of the MBR bootstrapping code such as an arithmetic logic unit, control unit, etc.

Memory emulation 284 allows emulated instructions to access a memory region, but does not provide unfettered access to the actual memory of the computer. Preferably, a region of memory is allocated within the emulation environment that is isolated from the regular memory and can be monitored by the emulator. Hard disk emulation 286 can emulate a hard disk by providing a disk image file on the host machine. I/O Proxy 288 provides support for any disk access APIs called by 274. The I/O proxy 288 may allow an emulated instruction to read particular sectors from the actual hard disk in hardware 240 (in addition to reading from emulated hard disk 286) as proper functioning of the bootstrapping code (including any expectation on the part of malware) may require that these sectors be read. In addition, the I/O proxy 288 will redirect all write operations to emulated hard disk 286 when the bootstrapping code expects to be able to write to certain sectors on the actual hard disk.

As mentioned above, because an MBR rootkit will often take advantage of spare disk sectors on the actual hard disk to store its malicious files, the I/O proxy 288 will be able to read such infected sectors from the actual hard disk in hardware 240 in order to keep the bootstrapping code running properly. For example, one variant of the TDSS rootkit family always reads specific disk sectors in order to obtain its private key to complete decryption of the master boot record. Without the assistance of the I/O proxy 288 in reading the actual disk, emulation of this master boot record infected with this type of rootkit would fail. Further, the I/O proxy is able to redirect any write operation to disk 286 in order to avoid infecting the actual disk during emulation of the MBR bootstrapping code.

Emulation agent 220 is a software application executing in user mode within operating system 230 and preferably outside of the environment of execution module 210. Agent 220 collects information during emulation of the master boot record. This information may include the actual executed instructions (decrypted), any access to memory addresses, the contents of each disk I/O operation, etc. Further, agent 220 collects information useful for analyzing the behavior of the MBR and information useful for allowing a scan engine to match the MBR signature in the instruction stream with a known virus signature. In another embodiment, the emulation agent 220 is a module within execution module 210 and collects the above information in a similar manner.

Flow Diagram

Figure 3:
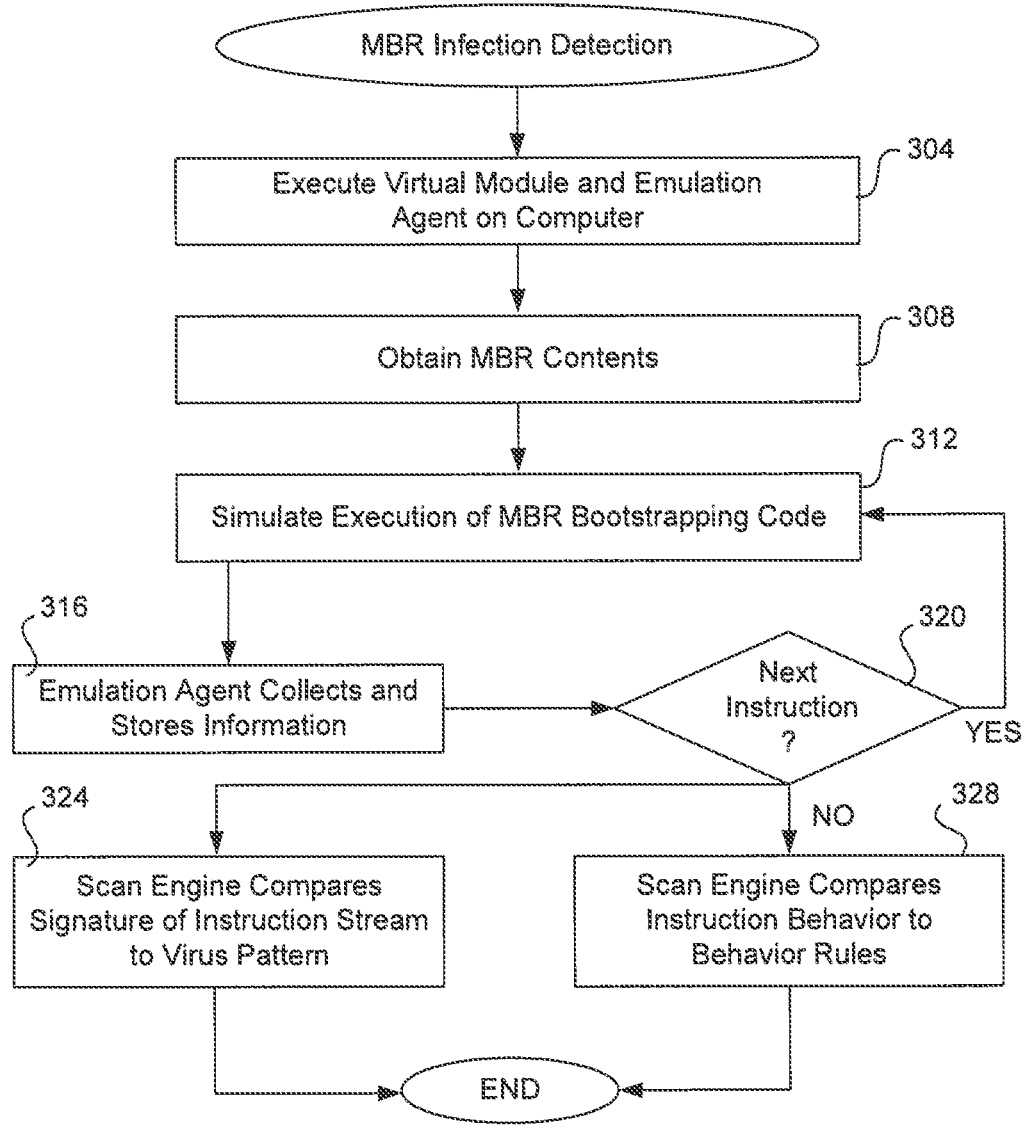
FIG. 3 is a flow diagram describing one embodiment by which infection of a master boot record is detected.

FIG. 3 is a flow diagram describing one embodiment by which infection of a master boot record is detected. In a first step 304, the host computer begins operating, it executes its operating system and it may be infected by malware, such as an MBR rootkit present in its master boot record. The execution module 210 begins execution as well as the emulation agent 220.

In step 308 module 210 obtains the contents from the master boot record and stores these contents within region 260, such as within memory allocated to the execution module. Retrieval of contents from the master boot record on the actual hard disk of the host computer may be performed using a suitable file I/O API (application programming interface) provided by the host operating system or by using a private kernel driver.

Although the master boot record contains other information in addition to the bootstrapping code (such as a partition table, disk information, etc.), in one embodiment it is only necessary to load the bootstrapping code from the master boot record into region 260. And, while a portion of this bootstrapping code may have been encrypted by malware, during the course of instruction execution the malware will automatically decrypt the code that it has encrypted.

In step 312 the execution module begins execution of the bootstrapping code using instruction emulator 278. In one embodiment, step 312 begins by executing the first instruction in the bootstrapping code (using emulated CPU 282 and the other modules within module 210), and then proceeds to execute each successive instruction in the loop shown in steps 312-320. If no malware is present, then the bootstrapping code is made up of legitimate instructions that are able to be executed by emulated CPU 282 (or by the actual CPU within hardware 240). If malware has infected the bootstrapping code, it is possible that any of the instructions of the bootstrapping code have been encrypted by the malware and cannot be executed by emulated CPU 282. But, MBR rootkits typically will contain a decryption routine that has been embedded within the bootstrapping code that will automatically decrypt the encrypted portions as the bootstrapping code is executed. Therefore, even if malware has encrypted a portion of the bootstrapping code, the malware itself will decrypt this bootstrapping code so that legitimate instructions are presented to the emulated CPU 282.

As each instruction is executed, the emulation agent 220 collects and stores relevant information in step 316. This information includes the raw instructions from the actual bootstrapping code of the MBR, the plain instructions captured as each instruction is executed on CPU emulator 282, any API calls made by the bootstrapping code to BIOS API 274, memory or disk operations, and other behavior described below. Different malware may encrypt the MBR instructions in different ways. The raw instructions are what are obtained from the MBR sector and the decrypted plain instructions are obtained from the instruction stream which is executed on CPU 282 one-by-one (and which may have been decrypted by code that is part of the malware). As explained below, the behavior rules can determine whether or not suspicious calls are made to a specific BIOS API.

In one embodiment, the stream of raw instructions and plain instructions are stored in actual memory of the host computer or are stored in a file on the actual disk of the host computer. Similarly, the captured API calls and other behavior made by the bootstrapping code may also be stored in actual memory or on the actual disk of the host computer. Capturing and storing this information in this manner allows a scan engine to later analyze any instructions and behavior of the master boot record. In another embodiment, resulting behavior is compared to behavior rules as the instructions are executed.

Step 320 determines whether there is a next instruction. If so, then control returns to step 312 for simulated execution of the next instruction. If not, then control moves to either step 324 or step 328, or both. Determining when the bootstrapping code has finished executing may be performed in different manners. In one embodiment, it is known that the partition boot record (PBR) is loaded into memory for execution after the MBR executes. The partition boot record then searches for the program "NtLoader" and launches it. The execution module 210 monitors this behavior and when it occurs the execution module 210 will stop.

Step 324 uses a scan engine to compare any virus signature or a virus pattern file to the plain instruction stream stored by the emulation agent in step 316. Because the instruction stream resulted from actual execution of the master boot record, in which any malware present would have decrypted the instructions, the instruction stream includes the raw, unencrypted bootstrapping code of the master boot record and may be compared to virus signatures. It is thus possible to determine the presence of any malicious software within the master boot record by determining if any virus signature matches this instruction stream.

In addition, step 328 may compare the behavior of instructions captured by emulation agent in step 316 to particular behavior rules indicating malicious activity. It is known that the BIOS interrupt call 13 (hexadecimal) "INT 13H" is a particular disk I/O operation; any hooking behavior to such a call may be considered suspect. And further, any INT 13H calls having particular sector numbers as parameters may be suspect if these are sectors where malware normally stores data or from where malware normally reads data.

In one specific embodiment, these rules indicate behavior of a particular MBR rootkit known as "TDL4," which behavior may also indicate presence of other types of malicious software within the master boot record. Suspicious behavior may include the following: 1) hooking the interrupt service routine with an index 0x13h in the interrupt vector table (a normal master boot record does not have such a hook); 2) reading raw disk sectors but not the VBR sector (a normal master boot record reads only the VBR sector); 3) performing self decryption (a normal master boot record does not perform decryption of itself); 4) jumping to an abnormal memory region (a normal MBR executes in a fixed memory region and will not jump out of this fixed region); 5) changing the value in memory address 0000:0413h (a normal master boot record will not change this value but malware will decrease the value in order to allocate more memory for itself. In other examples, calls to specific APIs in BIOS API 274 may be considered suspect by the behavior rules.

If steps 324 or 328 indicate that malicious software is present in the master boot record (either because instructions match a virus signature or because behaviors in the instructions match a rule or rules) then any suitable output may occur such as displaying a message on the screen of the computer, sending an e-mail message, communicating over a network, updating a remote Web site, printing a report, writing information to a file on the computer, etc.

Computer System Embodiment

Figure 4A:
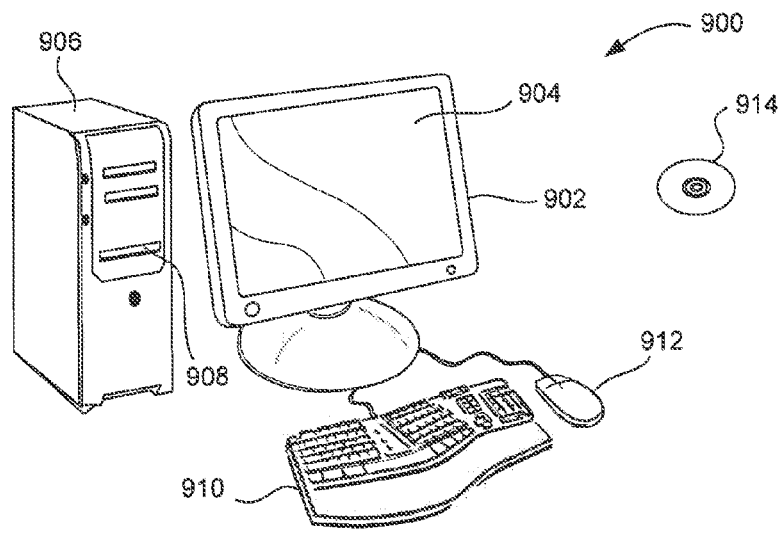
FIGS. 4A and 4B illustrate a computer system suitable for implementing embodiments of the present invention.
Figure 4B:
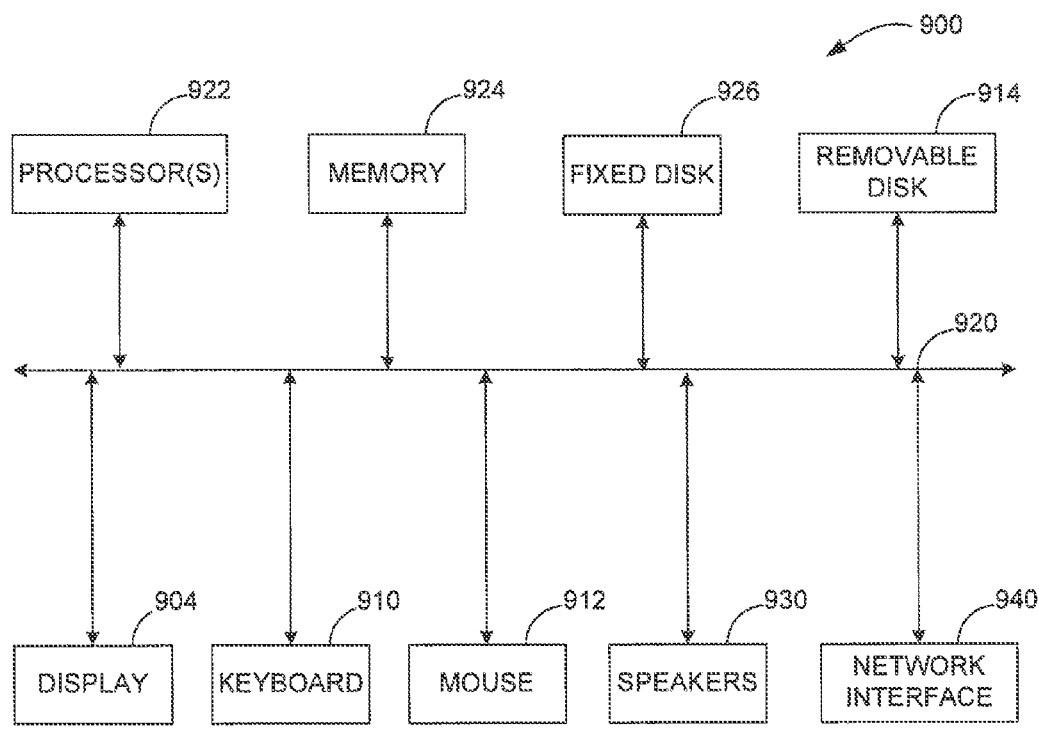

FIGS. 4A and 4B illustrate a computer system 900 suitable for implementing embodiments of the present invention. FIG. 4A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 4B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below. In addition to disks 914 and 926, other types of mass storage devices such as a solid-state disk may also be used.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of the computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting infection in a sector of a mass storage device of a computer, said method comprising:
   executing emulation software within an operating system of said computer, said emulation software creating an emulated computer within said operating system;
   reading, from said mass storage device of said computer, bootstrapping code from said sector of said mass storage device into said emulated computer;
   executing said bootstrapping code within said emulated computer;
   during said execution of said bootstrapping code, collecting and storing information resulting from said execution of said bootstrapping code; and
   comparing said stored information to information indicative of malware and outputting a result of said comparing.

2. The method as recited in claim 1 wherein said sector is a master boot record of a disk of said computer.

3. The method as recited in claim 1 further comprising:
   during said execution of said bootstrapping code, prohibiting an instruction of said bootstrapping code from writing information to a sector of said mass storage device.

4. The method as recited in claim 1 further comprising:
   collecting and storing instructions from said bootstrapping code that are executed within said emulated computer; and
   comparing said stored instructions to a virus signature.

5. The method as recited in claim 1 further comprising:
   collecting and storing behaviors performed by said executing bootstrapping code within said emulated computer;
   comparing said behaviors to at least one rule that indicates malicious software.

6. The method as recited in claim 1 further comprising:
   during said execution of said bootstrapping code, allowing an instruction of said bootstrapping code to read information from a second sector of said mass storage device.

7. The method as recited in claim 1 wherein said execution of said bootstrapping code decrypts a plurality of instructions of said bootstrapping code that had been encrypted, said method further comprising:
   collecting and storing said decrypted instructions from said bootstrapping code that are executed within said emulated computer; and
   comparing said decrypted instructions to a virus signature.

8. A method of detecting infection in a sector of a mass storage device of a computer, said method comprising:
   executing emulation software within an operating system of said computer, said emulation software creating an emulated computer within said operating system;
   reading, from said mass storage device of said computer, bootstrapping code from said sector of said mass storage device into said emulated computer;
   executing said bootstrapping code within said emulated computer;
   during said execution of said bootstrapping code, storing instructions from said bootstrapping code that are executed within said emulated computer; and
   comparing said stored instructions to a virus signature indicative of malware and outputting a result of said comparing.

9. The method as recited in claim 8 wherein said sector is a master boot record of a disk of said computer.

10. The method as recited in claim 8 further comprising:
    during said execution of said bootstrapping code, prohibiting an instruction of said bootstrapping code from writing information to a sector of said mass storage device.

11. The method as recited in claim 8 wherein said execution of said bootstrapping code decrypts a plurality of instructions of said bootstrapping code that had been encrypted, said method further comprising:
   storing said decrypted instructions from said bootstrapping code that are executed within said emulated computer; and
   comparing said decrypted instructions to said virus signature.

12. The method as recited in claim 8 further comprising:
   during said execution of said bootstrapping code, allowing a first instruction of said bootstrapping code to read information from a second sector of said mass storage device.

13. The method as recited in claim 12 further comprising:
   during said execution of said bootstrapping code, redirecting a second instruction of said bootstrapping code that is attempting to store information to said mass storage device to store information to memory in said computer that emulates said mass storage device.

14. The method as recited in claim 1 wherein said bootstrapping code includes instructions encrypted by malware that cannot be executed by a CPU of said computer, said method further comprising:
   said bootstrapping code decrypting said decrypted instructions before said decrypted instructions are executed within said emulated computer.

15. A method of detecting infection in a sector of a mass storage device of a computer, said method comprising:
   executing emulation software within an operating system of said computer, said emulation software creating an emulated computer within said operating system;
   reading, from said mass storage device of said computer, bootstrapping code from said sector of said mass storage device into said emulated computer;
   executing said bootstrapping code within said emulated computer;
   during said execution of said bootstrapping code, storing API calls made by said executing bootstrapping code within said emulated computer; and
   comparing said stored API calls to at least one rule that indicates malicious software and outputting a result of said comparing.

16. The method as recited in claim 15 wherein said sector is a master boot record of a disk of said computer.

17. The method as recited in claim 15 further comprising:
   during said execution of said bootstrapping code, redirecting an instruction of said bootstrapping code that is attempting to store information to said mass storage device to store information to memory in said computer that emulates said mass storage device.

18. The method as recited in claim 15 wherein said API calls are BIOS API calls.

19. The method as recited in claim 15 wherein said API calls request disk access of said mass storage device of said computer.

20. The method as recited in claim 15 further comprising:
   receiving said API calls within said emulated computer; and
   handling said API calls by an emulated BIOS API within said emulated computer without passing said API calls to an actual BIOS of said computer.

* * * * *